(12) United States Patent
Kim et al.

(10) Patent No.: US 8,009,152 B2
(45) Date of Patent: Aug. 30, 2011

(54) REFINED COORDINATE DETECTION METHOD AND ERROR CORRECTION METHOD FOR TOUCH PANEL

(75) Inventors: Kil-Sun Kim, Goyang-si (KR);
Yong-Churl Kim, Goyang-si (KR)

(73) Assignee: Nexio Co., Ltd. (KR)

( * ) Notice: Subject to any disclaimer, the term of this patent is extended or adjusted under 35 U.S.C. 154(b) by 833 days.

(21) Appl. No.: 12/067,449

(22) PCT Filed: Nov. 23, 2006

(86) PCT No.: PCT/KR2006/004957
§ 371 (c)(1),
(2), (4) Date: Mar. 19, 2008

(87) PCT Pub. No.: WO2007/083883
PCT Pub. Date: Jul. 26, 2007

(65) Prior Publication Data
US 2008/0225017 A1    Sep. 18, 2008

(30) Foreign Application Priority Data

Jan. 19, 2006  (KR) .................. 10-2006-0005932

(51) Int. Cl.
*G06F 3/042* (2006.01)
(52) U.S. Cl. ........ 345/175; 345/173; 345/180; 345/156; 463/37; 356/614; 356/615; 178/18.01; 178/18.11; 178/19.01; 178/19.05
(58) Field of Classification Search .......... 345/173–180, 345/156, 157; 356/614–615; 178/18.01–18.11; 178/19.01–19.05; 463/37–38
See application file for complete search history.

(56) References Cited

U.S. PATENT DOCUMENTS

| 4,916,308 | A |   | 4/1990 | Meadows |
| 5,355,149 | A | * | 10/1994 | Casebolt ....................... 345/175 |
| 6,594,023 | B1 |  | 7/2003 | Omura et al. |
| 2004/0196258 | A1 | * | 10/2004 | Fujioka et al. ................ 345/157 |
| 2006/0066590 | A1 | * | 3/2006 | Ozawa et al. ................. 345/173 |

FOREIGN PATENT DOCUMENTS

| JP | 10027067 | 1/1998 |
| JP | 11232024 | 8/1999 |

\* cited by examiner

*Primary Examiner* — Lun-Yi Lao
*Assistant Examiner* — Olga Merkoulova
(74) *Attorney, Agent, or Firm* — Park & Associates IP Law, P.C.

(57) ABSTRACT

A refined coordinate detection method for a touch panel, which more finely measures coordinates of an object without increasing the number of infrared emitting/receiving elements, and an error correction method, which minimizes position detection errors caused by received optical level errors due to external environment or their inherent characteristics, are provided. In the detection method, received levels of infrared emitting/receiving elements corresponding to left and right ends of object are measured and stored and the levels and a maximum received level are compared to calculate the refined coordinates. In the correction method, a lower limit level at a position where infrared reception is most significantly impeded by object is calculated through a comparison calculation of maximum and minimum received levels and it is detected that an object is present at a position only when a lower limit level at that position is not greater than the calculated one.

6 Claims, 4 Drawing Sheets

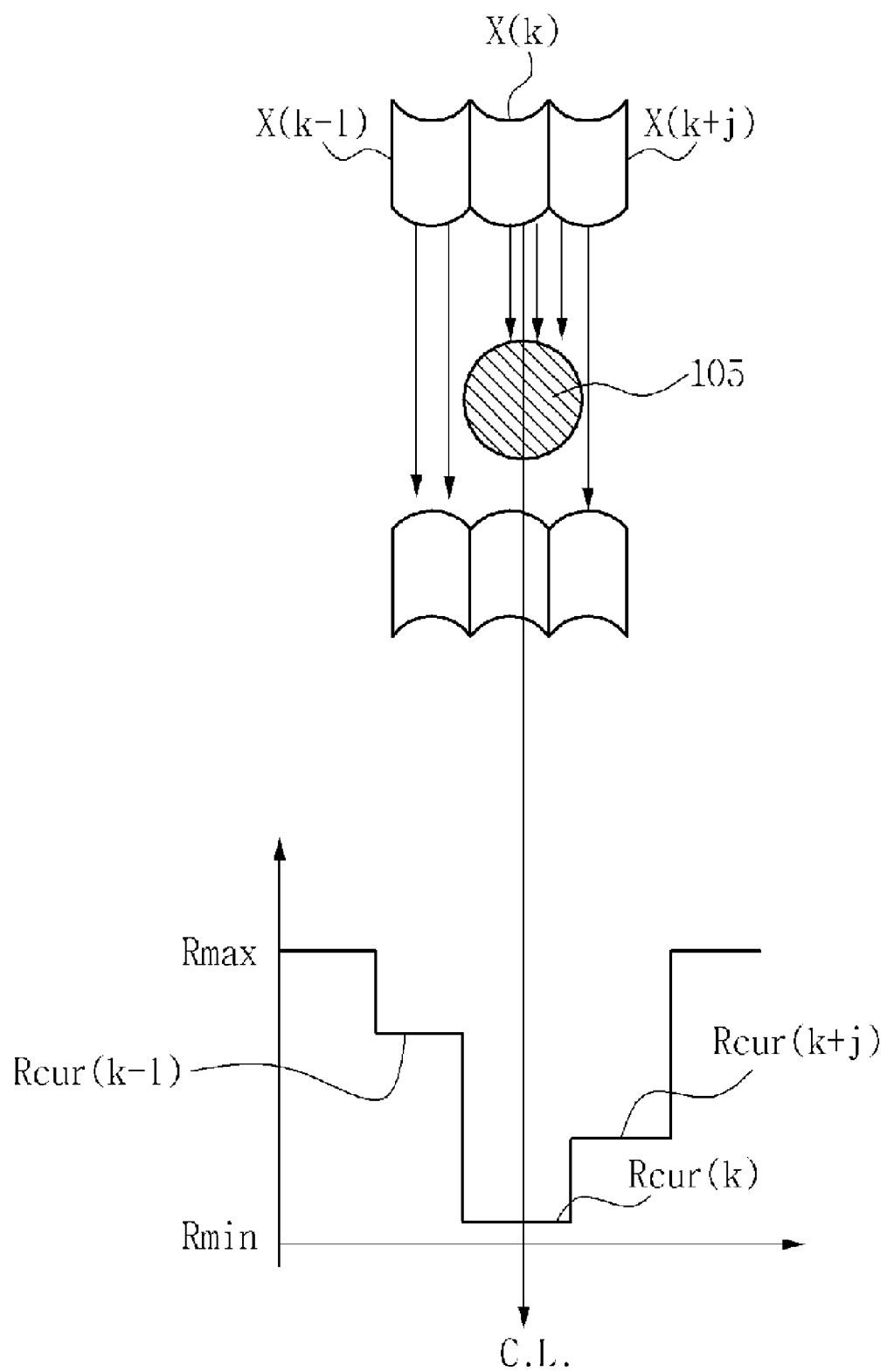
[Fig. 1]

[Fig. 2]
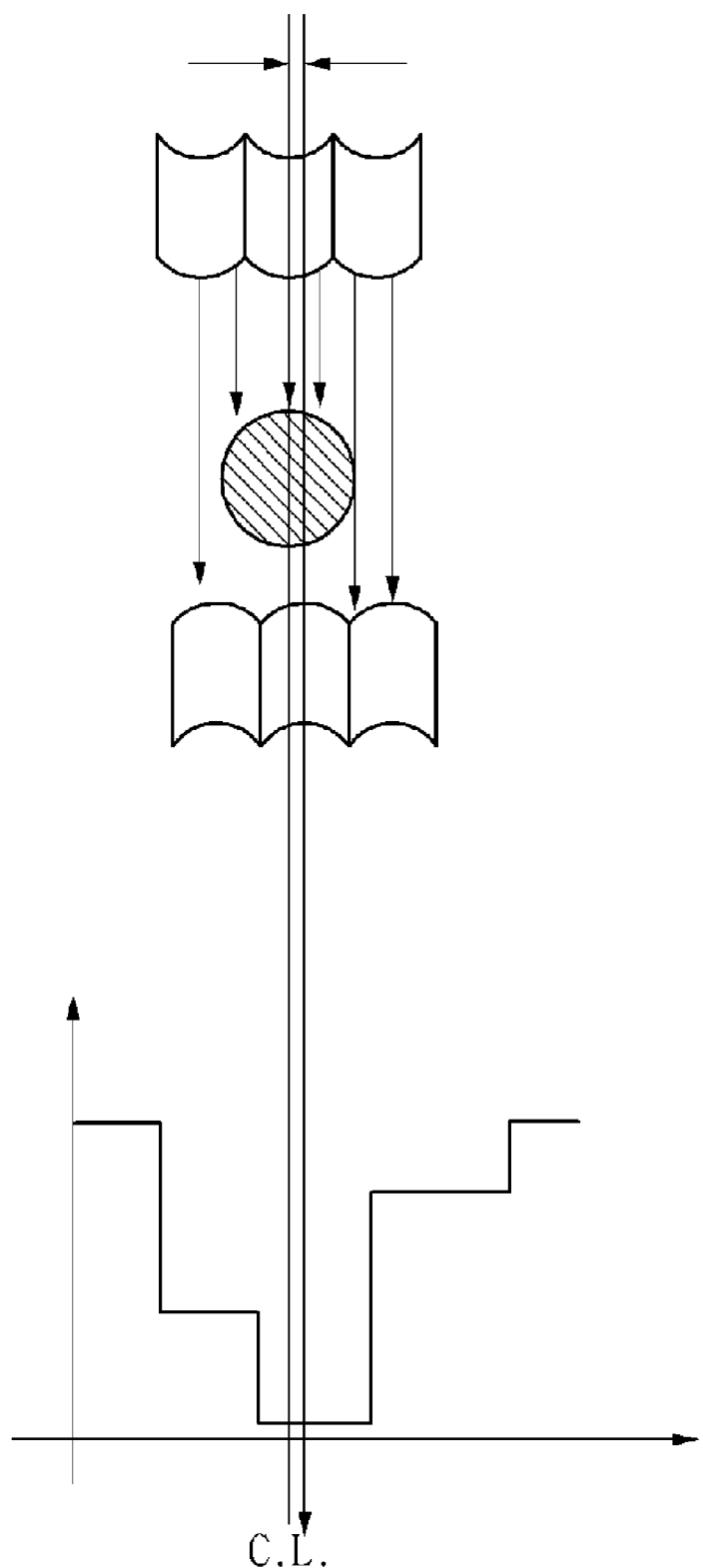

[Fig. 3]
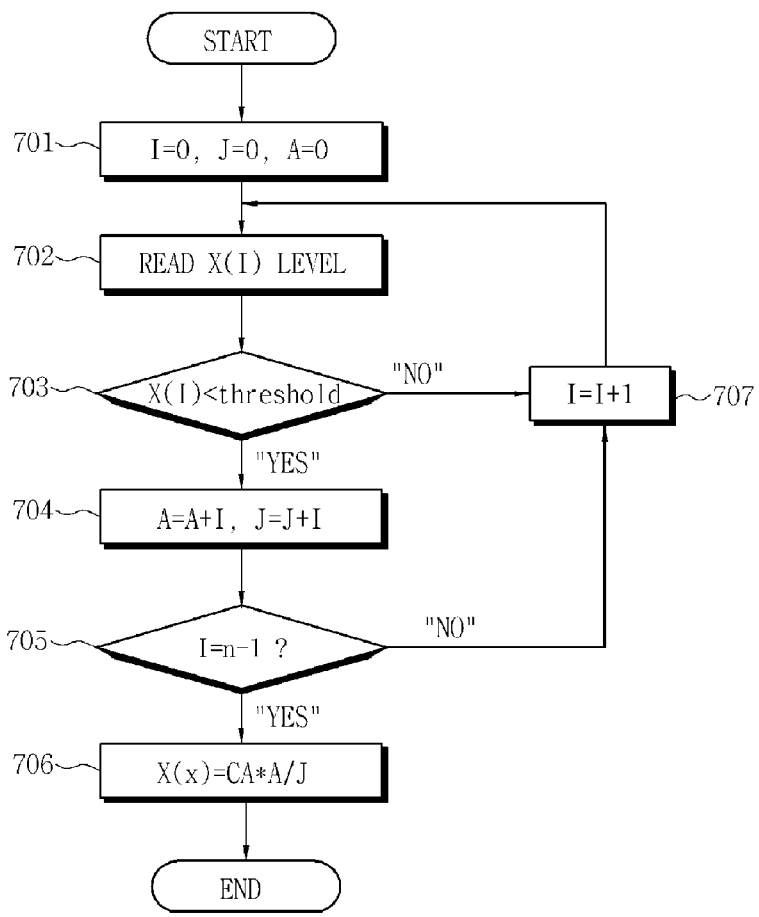
[Fig. 4]
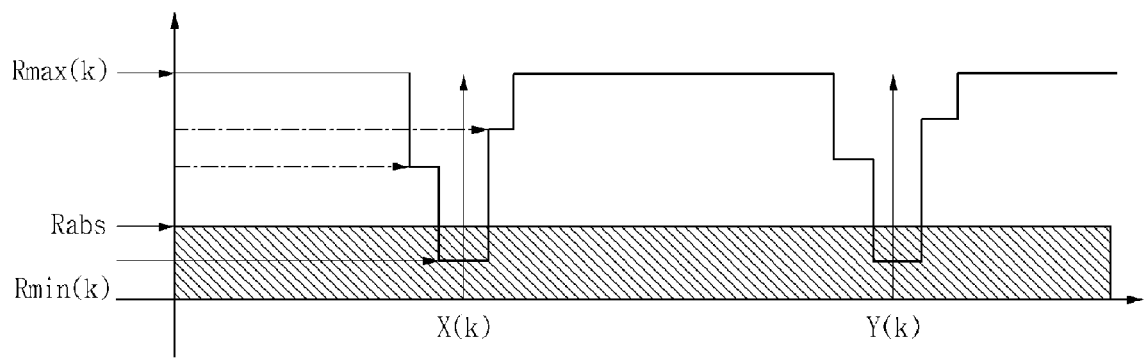

[Fig. 5]
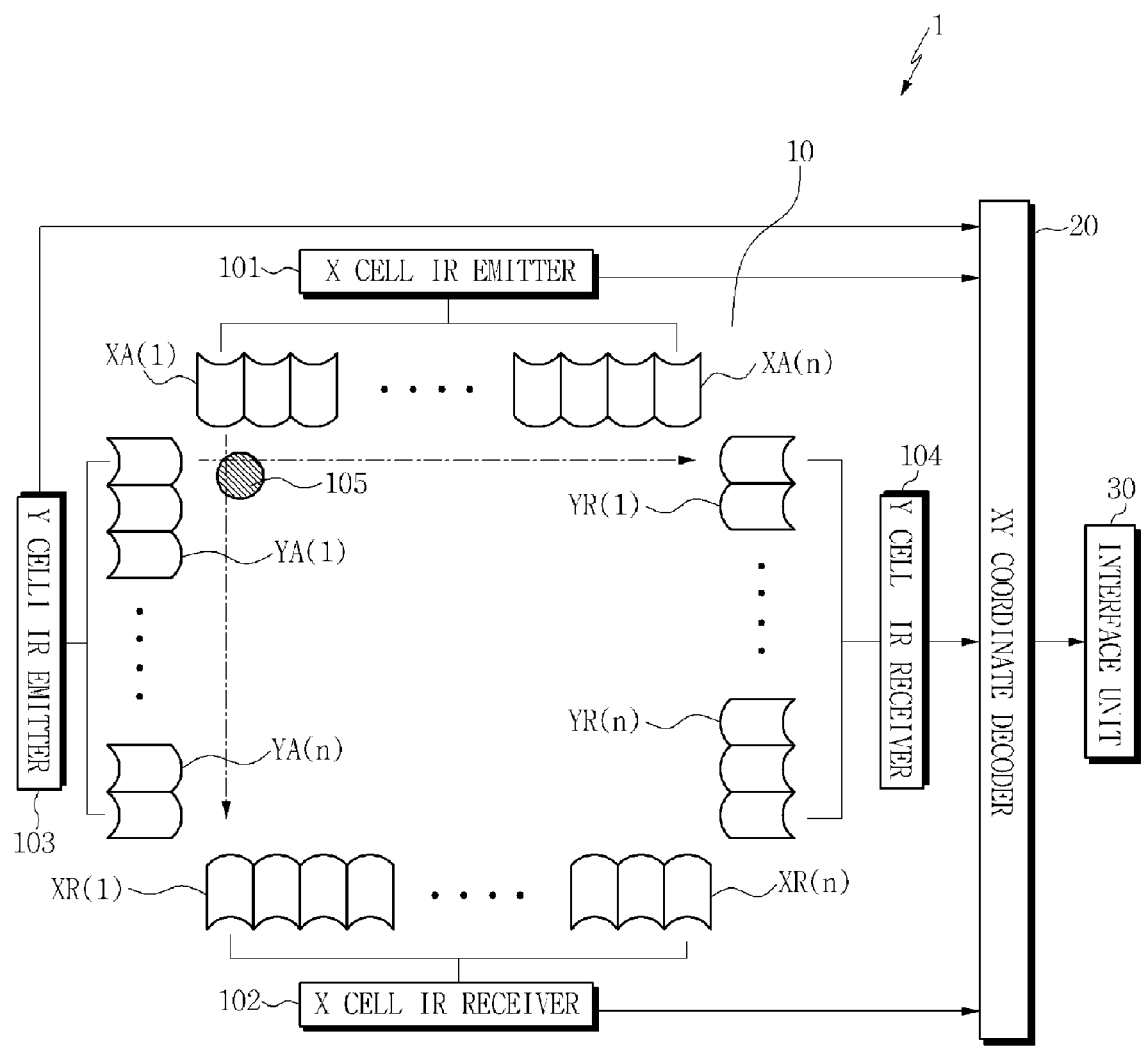

REFINED COORDINATE DETECTION METHOD AND ERROR CORRECTION METHOD FOR TOUCH PANEL

TECHNICAL FIELD

The present invention relates to a refined coordinate detection method and an error correction method for a touch panel, and more particularly to a method for detecting refined coordinates of an object in an infrared touch panel, which can more finely measure the coordinates of the object without increasing the number of infrared emitting and receiving elements, and a method for correcting errors in an infrared touch panel which can minimize position detection errors caused by errors in received levels of infrared receiving elements due to changes in external environment or due to inherent characteristics of the infrared receiving elements.

BACKGROUND ART

The touch panel is one of a variety of devices for providing interfaces between users and information and communications devices which use a variety of displays. Specifically, the touch panel is an input unit through which the user can interface with the information and communications device by directly touching its screen with their finger or pen.

The touch panel allows users to interactively and intuitively operate a computer or the like simply by touching buttons displayed on its display with their finger so that men, women, and children can easily use it as an input device. Thus, touch panels are applied to a wide variety of fields such as PDAs, LCDs, CRTs, equipment for banks or public offices, various medical equipment, travel guides, and guidance equipment for main facilities, and transportation guides.

Operating or implementing types of the touch panel include a resistive (or capacitive) film type, an SAW (surface acoustic wave) type, and an infrared matrix type. The resistive film type touch panel has a panel structure with a chemical agent coated between a glass and a thin film and thin metal plates attached to X and Y-axis sides of the panel. When power is supplied to a panel of this type, a specific resistance is created through the panel. Then, if a finger or other object touches a position on the panel, the chemical agent reacts to instantly change resistance at the position. The resistance change is detected at the metal plates on the sides of the panel and coordinates of the touched position are determined from the detected resistance change.

The infrared matrix type panel has horizontal and vertical infrared emission and detection arrays that are arranged on four sides of the panel to produce infrared rays in the shape of very closely crossed grids on the panel. When an object touches a position on this panel, the object blocks an infrared ray that propagates through that position and the blocking is detected to acquire position information of the touching object.

The infrared type touch panel is generally constructed as follows. A controller is provided on a portion of a PCB plate and a display unit is provided on a portion of the panel. A non-reflective acrylic plate is provided on a front surface of the display unit. A plurality of pairs of horizontal infrared emitting and receiving elements is provided on upper and lower edges of the panel and a plurality of pairs of vertical infrared emitting and receiving elements is provided on left and right edges of the panel to create an infrared matrix. A screen is provided on a rear surface of the display unit. When a user touches a portion of the infrared matrix created by the infrared emitting and receiving elements with their finger, an infrared ray at the portion is blocked to detect the position of the portion. The infrared matrix is controlled by the controller formed on a portion of the PCB plate.

DISCLOSURE OF INVENTION

Technical Problem

However, the user does not always touch the center of a cell corresponding to a pair of horizontal infrared emitting and receiving elements and a pair of vertical infrared emitting and receiving elements. The user may sometimes touch a position deviated from the center of the cell, for example, a corner or periphery of the cell. The conventional touch panel has limited resolution determined according to the number of infrared emitting and receiving elements and can detect the coordinates of an object only with the limited resolution. Thus, it is difficult for the conventional touch panel to detect accurate coordinates of an object when the object touches a position on the panel deviated from the center of a cell.

To detect highly accurate coordinates of an object which touches the panel, it is necessary to increase the resolution and thus to increase the number of infrared emitting and receiving elements. However, this results in an increase in the manufacturing costs.

In addition, when automation equipment including a conventional touch panel is greatly affected by external environment, for example, when it is suddenly exposed to intense light, the maximum detection level of an infrared receiver including infrared receiving elements is set to be excessively high. In this case, even when the user does not touch the panel, it may be erroneously detected that an object is present on the panel since the detected level of the infrared receiver without an object is significantly smaller than the excessively high maximum detection level.

Further, since the elements of the touch panel are easily affected by temperature, the infrared receiving elements of the touch panel may provide inaccurate or erroneous detection results.

Therefore, the present invention has been made in view of the above problems, and it is an object of the present invention to provide a refined coordinate detection method for a touch panel wherein, without increasing the number of infrared emitting and receiving elements, coordinates of an object can be measured more finely through a comparison calculation of a received optical level of a pair of central infrared emitting and receiving elements among a plurality of pairs of infrared emitting and receiving elements, infrared emission and reception of which is impeded by the object, and received optical levels of pairs of outermost infrared emitting and receiving elements among the plurality of pairs of infrared emitting and receiving elements.

It is another object to provide a relative error correction method for a touch panel, wherein a lower limit level obtained through a comparison calculation of maximum and minimum received levels of infrared emitting and receiving elements at an specific position is preset and it is then detected that an object is present only when a received level of a pair of infrared emitting and receiving elements, infrared emission and reception of which is impeded by the object, is less than or equal to the preset lower limit level, and an absolute error correction method for a touch panel, wherein an absolute received level of infrared receiving elements is preset and, if the minimum level of an infrared receiving element corresponding to a specific position is greater than the preset absolute level, the maximum level of the infrared receiving element corresponding to the specific position is stored as "0"

and the maximum level is again measured and calculated, thereby correcting an error of the maximum infrared received level of infrared receiving elements that has been excessively increased by external environment.

Technical Solution

In accordance with an aspect of the present invention, the above and other objects can be accomplished by the provision of a refined coordinate detection method for a touch panel including a plurality of X-axis infrared emitting and receiving elements and a plurality of Y-axis infrared emitting and receiving elements, the method comprising measuring and storing a maximum received optical level of a pair of infrared emitting and receiving elements, infrared emission and reception of which is not impeded by an object, and a minimum received optical level of a pair of infrared emitting and receiving elements, infrared emission and reception of which is completely impeded by the object; measuring and storing a received optical level of a pair of infrared emitting and receiving elements placed on a center axis of the object, a received optical level of a pair of infrared emitting and receiving elements corresponding to a left end of the object, and a received optical level of a pair of infrared emitting and receiving elements corresponding to a right end of the object; calculating basic coordinates of the object based on the received optical level of the pair of infrared emitting and receiving elements placed on the center axis of the object; and calculating refined coordinates of the object by comparing the maximum received optical level and the received optical levels of the two pairs of infrared emitting and receiving elements corresponding to the left and right ends of the object.

In accordance with another aspect of the present invention, there is provided an error correction method for a touch panel including a plurality of X-axis infrared emitting and receiving elements and a plurality of Y-axis infrared emitting and receiving elements, the method comprising measuring and storing a maximum optical level that is read from infrared receiving elements through infrared emission and reception of a plurality of infrared emitting and receiving elements; measuring and storing a minimum optical level read from an infrared receiving element corresponding to a position at which infrared reception is most significantly impeded by an object; calculating a lower limit level at the position at which infrared reception is most significantly impeded by the object through a comparison calculation of the maximum and minimum optical levels; and detecting that an object is present at a given position only when a lower limit level at the given position is less than or equal to the lower limit level at the position at which infrared reception is most significantly impeded.

Preferably, the error correction method according to the present invention further comprises presetting an absolute minimum optical level that is read from infrared receiving elements through infrared emission and reception of a plurality of infrared emitting and receiving elements; and detecting the stored maximum optical level as zero if the minimum optical level read from the infrared receiving element corresponding to the position at which infrared reception is most significantly impeded by the object is greater than the absolute minimum optical level and repeating infrared emission and reception of the plurality of infrared emitting and receiving elements to measure and store a maximum optical level read from the infrared receiving elements.

Advantageous Effects

Without increasing the number of infrared emitting and receiving elements, coordinates of an object can be measured more finely through a comparison calculation of a received optical level of a pair of central infrared emitting and receiving elements among a plurality of pairs of infrared emitting and receiving elements, infrared emission and reception of which is impeded by the object, and received optical levels of pairs of outermost infrared emitting and receiving elements among the plurality of pairs of infrared emitting and receiving elements. This makes it possible to provide high resolution at low manufacturing costs.

In addition, the present invention overcomes the problem that, even when no object is present, it is detected that an object is present due to inherent errors of infrared emitting and receiving elements or due to errors caused by external environment. This allows more accurate object detection.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 are drawings illustrating a refined coordinate detection method according to the present invention, where FIG. 1 shows infrared emission and reception when an object is deviated to the right and FIG. 2 shows infrared emission and reception when the object is deviated to the left;

FIG. 3 is a flow chart illustrating how basic coordinates of an object are measured according to the present invention;

FIG. 4 is a schematic diagram illustrating a relative error correction method according to the present invention; and FIG. 5 is a schematic diagram illustrating the structure of a touch panel system.

BEST MODE FOR CARRYING OUT THE INVENTION

A refined coordinate detection method and an error correction method for a touch panel according to the present invention will now be described with reference to the accompanying drawings.

As shown in FIG. 5, a touch panel 1 according to the present invention includes a display unit 10, an XY coordinate decoder 20, and an interface unit 30.

The display unit 10 includes an X-axis infrared emitter 101, an X-axis infrared receiver 102, a Y-axis infrared emitter 103, and a Y-axis infrared receiver 104. The X-axis infrared emitter 101 includes a plurality of infrared emitting elements sequentially arranged in the X-axis direction. The X-axis infrared receiver 102 is arranged opposite the X-axis infrared emitter 101 and includes a plurality of infrared receiving elements that receive infrared rays emitted from the plurality of infrared emitting elements of the X-axis infrared emitter 101. The Y-axis infrared emitter 103 includes a plurality of infrared emitting elements sequentially arranged in the Y-axis direction. The Y-axis infrared receiver 104 is arranged opposite the Y-axis infrared emitter 103 and includes a plurality of infrared receiving elements that receive infrared rays emitted from the plurality of infrared emitting elements of the Y-axis infrared emitter 103.

The XY coordinate decoder 20 receives signals from the X-axis and Y-axis infrared emitters and receivers 101, 102, 103, and 104 and numerically calculates coordinates of an object 105.

The interface unit 30 transmits the calculated coordinate data of the object 105 from the decoder 20 to a controller (not shown) of an automation device such as a computer.

Specifically, n infrared emitting elements XA(1), XA(2), ..., and XA(n) are arranged in the X-axis infrared emitter 101 and n infrared receiving elements XR(1), XR(2), ..., and XR(n) are arranged in the X-axis infrared receiver 102. In addition, n infrared emitting elements YA(1), YA(2), ..., and YA(n) are arranged in the Y-axis infrared emitter 103 and m infrared receiving elements YR(1), YR(2), ..., and YR(n) are arranged in the Y-axis infrared receiver 104.

A coordinate detection method using the touch panel constructed as described above will now be described with reference to FIG. 3.

In the touch panel 1 according to the present invention, first, the infrared emitting elements arranged in the X-axis infrared emitter 101 sequentially emit infrared rays. For example, the X-axis infrared emitter 101 is constructed such that the infrared emitting element XA(1) first emits an infrared ray while the remaining infrared emitting elements XA(2), X(3), ..., and XA(n) emit no infrared ray and then each of the remaining infrared emitting elements XA(2), X(3), ..., and XA(n) emits an infrared ray in the order of XA(2), X(3), ..., and XA(n) in the same manner while the other infrared emitting elements emit no infrared ray.

As shown in FIG. 3, the infrared emitting elements arranged in the X-axis infrared emitter 101 sequentially emit infrared rays and the infrared receiving elements arranged in the X-axis infrared receiver 102, which are paired with the infrared emitting elements, sequentially receive the emitted infrared rays. The level of an electrical signal corresponding to an optical signal read from an Ith infrared receiving element in the X-axis infrared receiver 102 which is paired with an Ith infrared emitting element is converted into a digital value and the digital value is then stored as X(I). Then, it is determined whether or not X(I) is less than a predetermined lower limit level. When a user touches a position on the touch panel 1, the touching impedes infrared emission from an infrared emitting element corresponding to the position, so that an optical signal level read from an infrared receiving element corresponding to the position is less than the lower limit level. Accordingly, if X(I) is less than the lower limit level, it is determined that the object 105 is positioned between a pair of the Ith infrared emitting and receiving elements and its coordinate is calculated.

Basic X and Y coordinates of an object are calculated by the following equation.

$$X(n) = CA\, A_i/J_i \text{ and } Y(n) = CA\, A_i/J_i,$$

where $A_i = A_{i-1} + I_i$, $J_i = J_{i-1} + 1$, $J_0 = 0$, $A_0 = 0$, $I_0 = 0$, $i = 1, 2, 3, \ldots, n$, and $CA = 1000/n$ if logical resolution for calculation is "1000" and the number of infrared emitting or receiving elements is "n".

Then, refined coordinates of the object are calculated. As shown in FIGS. 1 and 2, the object 105 impedes infrared emission and reception by elements X(k−l), X(k), and X(k+j). FIG. 1 illustrates how refined coordinates of the object 105 are calculated when the object 105 is placed slightly to the right of the center axis of a pair of infrared emitting and receiving elements X(k) and FIG. 1 illustrates how refined coordinates of the object 105 are calculated when the object 105 is placed slightly to the left of the center axis of the elements X(k).

As shown in FIGS. 1 and 2, a maximum received optical level Rmax of infrared emitting and receiving elements, infrared emission and reception of which is not impeded by the object 105, and a minimum received optical level Rmin of infrared emitting and receiving elements, infrared emission and reception of which is completely impeded by the object 105, are measured and stored. Then, a received optical level Rcur(k) of a pair of infrared emitting and receiving elements X(k), which are placed on the center axis of the object 105, a received optical level Rcur(k−l) of a pair of infrared emitting and receiving elements X(k−l) corresponding to the left end (or leftmost portion) of the object 105, and a received optical level Rcur(k+j) of a pair of infrared emitting and receiving elements X(k+j) corresponding to the right end (or rightmost portion) of the object 105 are measured and stored.

Refined coordinates of the object 105 can be calculated by measuring the difference between the received optical levels of infrared receiving elements corresponding to the right and left ends of the object 105 as described above. For example, a coordinate error is "100" if the number of X-axis infrared receiving elements is "10" and the logical resolution has a value of "1000" To reduce this error, a variation in the range of 0 to ±50 indicating a deviation from the center of the object 105 in the refined coordinates with a refined coordinate resolution of "100" can be calculated by measuring the difference between received optical levels of infrared receiving elements, infrared emission and reception of which is impeded by outermost portions (e.g., right and left ends) of the object 105.

Refined coordinates ($F_x$, $F_y$) of the object 105 are calculated using the following equations by comparing the maximum received optical level and the received optical levels of the infrared receiving elements corresponding to the right and left ends of the object 105.

$$F_x = \frac{(R_{max}(k-l) - R_{cur}(k-l))}{R_{cur}(k-l)} \times A - \frac{(R_{max}(k+j) - R_{cur}(k+j))}{R_{cur}(k+j)} \times A \qquad \text{(Math Figure 1)}$$

and $$F_y = \frac{(R_{max}(k-l) - R_{cur}(k-l))}{R_{cur}(k-l)} \times A - \frac{(R_{max}(k+j) - R_{cur}(k+j))}{R_{cur}(k+j)} \times A$$

where "A" denotes refined coordinate resolution and, if the refined coordinate resolution "A" is set to 100, $F_x$ and $F_y$ can be calculated as a value in the range of 0 to 100.

The final accurate coordinates (X(x), Y(y)) of the object 105 can be obtained by substituting the values obtained by the equations of Math FIG. 1 into the following equations.

$$X(x) = CA_x \times X(k) + \frac{F_x}{A} \times CA_x \text{ and} \qquad \text{(Math Figure 2)}$$

$$Y(y) = CA_y \times Y(k) + \frac{F_y}{A} \times CA_y$$

where CA="logical resolution"/"number of elements" and ($CA_x X(k)$, $CA_y \times Y(k)$) are basic coordinates of the object.

"CA" is 100 if the logical resolution is 1000 and the number of elements is 10.

On the other hand, the infrared emitting and receiving elements included in the touch panel may have errors due to their inherent characteristics and may also have errors according to temperature or the like. Such inherent errors of the elements can be corrected through a comparison calculation of the maximum and minimum optical levels read from the infrared receiving elements as shown in FIG. 4.

In FIG. 4, "X(k)" denotes a position corresponding to one of the n infrared receiving elements XR(n), at which infrared reception is most significantly impeded by the object and "Y(k)" denotes a position corresponding to one of the n infrared receiving elements YR(n), at which infrared reception is most significantly impeded by the object.

The plurality of infrared emitting and receiving elements is sequentially scanned to measure and store the maximum optical level Rmax(k) read from the infrared receiving elements and to measure and store the minimum optical level Rmin(k) read from the infrared receiving element corresponding to the position X(k) at which infrared reception is most significantly impeded by the object. Then, a lower limit level "threshold(k) at the position at which infrared reception is most significantly impeded by the object is calculated by substituting the maximum level Rmax(k) and the minimum level Rmin(k) into the following equation.

$$\text{Threshold}(k) = \frac{(R_{max}(k) - R_{min}(k))}{R_{max}(k)} \times 100 \quad \text{(Math Figure 3)}$$

The lower limit level "Threshold(k)" is calculated in percentage from 0 to 100%.

Then, only when the lower limit level at a given position is less than or equal to the lower limit level at the position at which infrared reception is most significantly impeded, it is detected that an object is present at the given position.

In the above manner, the same object detection condition can be applied to every "k" regardless of the absolute optical level detected with an object. Specifically, a condition "Threshold(k)"<50 can be provided as a condition in which it is possible to detect an object such that, when a change by which the optical level is reduced by the object is less than 50% at a position, it is possible to detect that an object is present at that position.

On the other hand, when only the relative errors specific to the elements of the touch panel are corrected as described above, an excessively high optical level may be read from infrared receiving elements and then be stored due to external environment, thereby causing object detection errors. For example, when intense light is suddenly received from the outside, a very large maximum level Rmax(k) is stored so that, even when no object is present, the condition "Threshold (k)"<50 may be satisfied and it may be erroneously detected that an object is present.

Accordingly, an absolute minimum optical level Rabs, which is read from the infrared receiving elements through infrared emission and reception of the plurality of infrared emitting and receiving elements, is preset as shown in FIG. 4. Then, if the minimum optical level Rmin(k) read from the infrared receiving element corresponding to the position X(k) at which infrared emission and reception is most significantly impeded is greater than the absolute minimum level Rabs, the stored maximum level is detected as "zero" and the plurality of infrared emitting and receiving elements is rescanned to measure and store a corrected maximum optical level read from the infrared receiving elements.

Errors caused by the maximum level Rmax(k) excessively increased by external environment are corrected in the above manner.

The present invention provides a refined coordinate detection method and an error correction method for a touch panel, which have a variety of advantages.

For example, without increasing the number of infrared emitting and receiving elements, coordinates of an object can be measured more finely through a comparison calculation of a received optical level of a pair of central infrared emitting and receiving elements among a plurality of pairs of infrared emitting and receiving elements, infrared emission and reception of which is impeded by the object, and received optical levels of pairs of outermost infrared emitting and receiving elements among the plurality of pairs of infrared emitting and receiving elements. This makes it possible to provide high resolution at low manufacturing costs.

In addition, the present invention overcomes the problem that, even when no object is present, it is detected that an object is present due to inherent errors of infrared emitting and receiving elements or due to errors caused by external environment. This allows more accurate object detection.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A refined coordinate detection method for a touch panel including a plurality of X-axis infrared emitting and receiving elements and a plurality of Y-axis infrared emitting and receiving elements, the method comprising:

measuring and storing a maximum received optical level of a pair of infrared emitting and receiving elements, infrared emission and reception of which is not impeded by an object, and a minimum received optical level of a pair of infrared emitting and receiving elements, infrared emission and reception of which is completely impeded by the object;

measuring and storing a received optical level of a pair of infrared emitting and receiving elements placed on a center axis of the object, a received optical level of a pair of infrared emitting and receiving elements corresponding to a left end of the object, and a received optical level a pair of infrared emitting and receiving elements corresponding to a right end of the object;

calculating basic coordinates of the object based on the received optical level of the pair of infrared emitting and receiving elements placed on the center axis of the object; and calculating refined coordinates of the object by comparing the maximum received optical level and the received optical levels of the two pairs of infrared emitting and receiving elements corresponding to the left and right ends of the object.

2. The refined coordinate detection method according to claim 1, wherein the calculation of the refined coordinates of the object by comparing the maximum received optical level and the received optical levels of the two pairs of infrared emitting and receiving elements is based on the following equation:

$$F_x = \frac{(R_{max}(k-l) - R_{cur}(k-l))}{R_{cur}(k-l)} \times A - \frac{(R_{max}(k+j) - R_{cur}(k+j))}{R_{cur}(k+j)} \times A \text{ and}$$

$$F_y = \frac{(R_{max}(k-l) - R_{cur}(k-l))}{R_{cur}(k-l)} \times A - \frac{(R_{max}(k+j) - R_{cur}(k+j))}{R_{cur}(k+j)} \times A$$

where "Rmax(k-l)" and "Rmax(k+j)" denote maximum received optical levels of infrared emitting and receiving elements, infrared emission and reception of which are not impeded by an object at positions corresponding to k-lth and k+jth infrared receiving elements, "Rcur(k- l)" denotes a received optical level of a k−lth pair of infrared emitting and receiving elements "X(k−l)" corresponding to a left end of the object, "Rcur(k+j)" denotes a received optical level of a k+jth pair of infrared emitting and receiving elements "X(k+j)" corresponding to a right end of the object, and "A" denotes resolution of refined coordinates.

3. An error correction method for a touch panel including a plurality of X-axis infrared emitting and receiving elements and a plurality of Y-axis infrared emitting and receiving elements, the method comprising:

measuring and storing a maximum optical level that is read from infrared receiving elements through infrared emission and reception of a plurality of infrared emitting and receiving elements;

measuring and storing a minimum optical level read from an infrared receiving element corresponding to a position at which infrared reception is most significantly impeded by an object;

calculating a lower limit level at the position at which infrared reception is most significantly impeded by the object through a comparison calculation of the maximum and minimum optical levels; and detecting that an object is present at a given position only when a lower limit level at the given position is less than or equal to the lower limit level at the position at which infrared reception is most significantly impeded.

4. The error correction method according to claim 3, wherein the calculation of the lower limit level at the position at which infrared reception is most significantly impeded by the object through the comparison calculation of the maximum and minimum optical levels is based on the following equation:

$$\text{Threshold}(k) = \frac{(R_{max}(k) - R_{min}(k))}{R_{max}(k)} \times 100$$

where "Threshold (k)" denotes a lower limit level, "Rmax (k)" denotes a maximum optical level that is read from infrared receiving elements through sequential infrared emission and reception of a plurality of infrared emitting and receiving elements, and "Rmin(k)" denotes a minimum optical level read from an infrared receiving element corresponding to a position "X(k)" at which infrared reception is most significantly impeded by an object.

5. The error correction method according to claim 3, further comprising:

presetting an absolute minimum optical level that is read from infrared receiving elements through infrared emission and reception of a plurality of infrared emitting and receiving elements; and detecting the stored maximum optical level as zero if the minimum optical level read from the infrared receiving element corresponding to the position at which infrared reception is most significantly impeded by the object is greater than the absolute minimum optical level and repeating infrared emission and reception of the plurality of infrared emitting and receiving elements to measure and store a maximum optical level read from the infrared receiving elements.

6. The error correction method according to claim 4, further comprising:

presetting an absolute minimum optical level that is read from infrared receiving elements through infrared emission and reception of a plurality of infrared emitting and receiving elements; and detecting the stored maximum optical level as zero if the minimum optical level read from the infrared receiving element corresponding to the position at which infrared reception is most significantly impeded by the object is greater than the absolute minimum optical level and repeating infrared emission and reception of the plurality of infrared emitting and receiving elements to measure and store a maximum optical level read from the infrared receiving elements.

* * * * *